(12) United States Patent
Hsieh et al.

(10) Patent No.: US 8,658,052 B2
(45) Date of Patent: Feb. 25, 2014

(54) METHOD FOR MAKING A HIGHLY THERMALLY CONDUCTIVE COMPOSITE

(75) Inventors: Chi-Fa Hsieh, Taoyuan County (TW);
Fu-Yen Ling, Taoyuan County (TW);
Yeng-Fong Shih, Taoyuan County (TW);
Wei-Chen Liu, Taoyuan County (TW)

(73) Assignee: Chung-Shan Institute of Science and Technology, Armaments, Bureau, Ministry of Naional Defense, Taoyuan County (TW)

( * ) Notice: Subject to any disclaimer, the term of this patent is extended or adjusted under 35 U.S.C. 154(b) by 346 days.

(21) Appl. No.: 13/196,472

(22) Filed: Aug. 2, 2011

(65) Prior Publication Data
US 2012/0313033 A1 Dec. 13, 2012

(30) Foreign Application Priority Data
Jun. 10, 2011 (TW) .............................. 100120279 A

(51) Int. Cl.
*C09K 5/00* (2006.01)

(52) U.S. Cl.
USPC ................... 252/73; 252/74; 252/75; 252/76; 252/77

(58) Field of Classification Search
None
See application file for complete search history.

(56) References Cited

U.S. PATENT DOCUMENTS

| 5,756,580 A * | 5/1998 | Natori et al. ................... 525/100 |
| 2012/0219719 A1 * | 8/2012 | Yu ................................. 427/358 |

\* cited by examiner

*Primary Examiner* — Necholus Ogden, Jr.
(74) *Attorney, Agent, or Firm* — Jackson IPG PLLC

(57) ABSTRACT

Disclosed is a method for making a highly thermally conductive composite. At first, paraffin wax is subjected to apparent modification. Expandable graphite is oxidized and organically modified. The modified paraffin wax is melted and mixed with the modified expandable graphite so that the modified expandable graphite is evenly distributed in the modified paraffin wax. With the expandable graphite, which exhibits an excellent heat transfer coefficient, the thermal conductivity of the paraffin wax is improved. The melting and solidifying rates of the paraffin wax are improved.

17 Claims, 3 Drawing Sheets

METHOD FOR MAKING A HIGHLY THERMALLY CONDUCTIVE COMPOSITE

BACKGROUND OF INVENTION

1. Field of Invention

The present invention relates to a method for making a highly thermally conductive composite and, more particularly, to a method for making a highly thermally conductive composite by melting and mixing modified paraffin wax with organic modified expandable graphite.

2. Related Prior Art

Paraffin wax is a potential heat-storing material that stores or releases heat via transformation of physical states. Paraffin wax stores heat when it transforms to liquid from solid and releases heat when it transforms to solid from liquid. This transformation is phase transformation. Paraffin wax however exhibits a poor thermal transfer coefficient. That is, the melting and solidification of paraffin wax are slow. In other words, heat transfer through paraffin wax is slow. Therefore, for storing heat, paraffin wax is often mixed with a highly thermally conductive material to increase the heat transfer rate. Graphite is a good choice as a highly thermally conductive material to be added into paraffin wax to this end.

Graphite includes a two-dimensional structure that consists of six carbon atoms. In graphite, layers and layers are bonded by van der Waal's forces.

Graphite is refractory, highly electrically conductive, highly thermally conductive and highly plastic. Graphite exhibits a low frictional coefficient but excellent viscosity for including scales and leaves, and this is why it is highly plastic. Graphite is not metal mineral but exhibits properties of metal organic compounds because its lattice includes layers of atoms are arranged in a compact manner and electrons can easily travel in the lattice for conducting electricity and heat between the atoms. Therefore, graphite exhibits excellent electrical conductivity and thermal conductivity. If paraffin wax is mixed with more graphite, the mixture exhibits better thermal conductivity. Moreover, at the normal temperature, graphite is chemically stable and stands strong acids, strong alkalis and organic solutions.

Expandable graphite ("EG") exhibits a low density and a low thermal expansion coefficient, is refractory, and absorbs waves. Based on the ways the crystals build up and the foam structures, expandable graphite can be used as a thermally conductive or insulating material. In early days, expandable graphite was used in the aerospace industry. Expandable graphite is now used in the electronic industry because its carbon atoms build up perfectly and it exhibits an excellent heat transfer coefficient. Furthermore, expandable graphite includes open cells in communication with one another. Expandable graphite exhibits a high specific surface for heat dissipation via convection. Expandable graphite exhibits a high heat transfer coefficient and is therefore commonly used as a thermally conductive material. Paraffin wax and graphite are organic or inorganic, respectively. Hence, it is difficult to mix expandable graphite with paraffin wax evenly.

The present invention is therefore intended to obviate or at least alleviate the problems encountered in prior art.

SUMMARY OF INVENTION

It is an objective of the present invention to provide a method for making a highly thermally conductive composite by melting and mixing modified paraffin wax with organic modified expandable graphite.

It is another objective of the present invention to provide a method for making modified paraffin wax by reacting paraffin wax with Maleic anhydride and an initiator so that the paraffin wax includes the functional group of anhydride on side chains to increase its compatibility with organic additives.

It is another objective of the present invention to provide a method for making organic modified expandable graphite by submerging expandable graphite (EG) in a strong acid solution for oxidation.

To achieve the foregoing objectives, the method includes the steps of: providing a first basic material, providing a second basic material, oxidizing the first basic material so that the first basic material includes the functional group of carboxylic on the surface, adding octadecyl alcohol to the first basic material, providing a dehydrating agent for providing ester bonds between the first basic material and the octadecyl alcohol to modify the first basic material with the octadecyl alcohol, executing apparent activation on the second basic material to modify the second basic material, and melting and mixing the modified first basic material with the modified second basic material so that the modified first basic material is evenly distributed in the modified second basic material.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
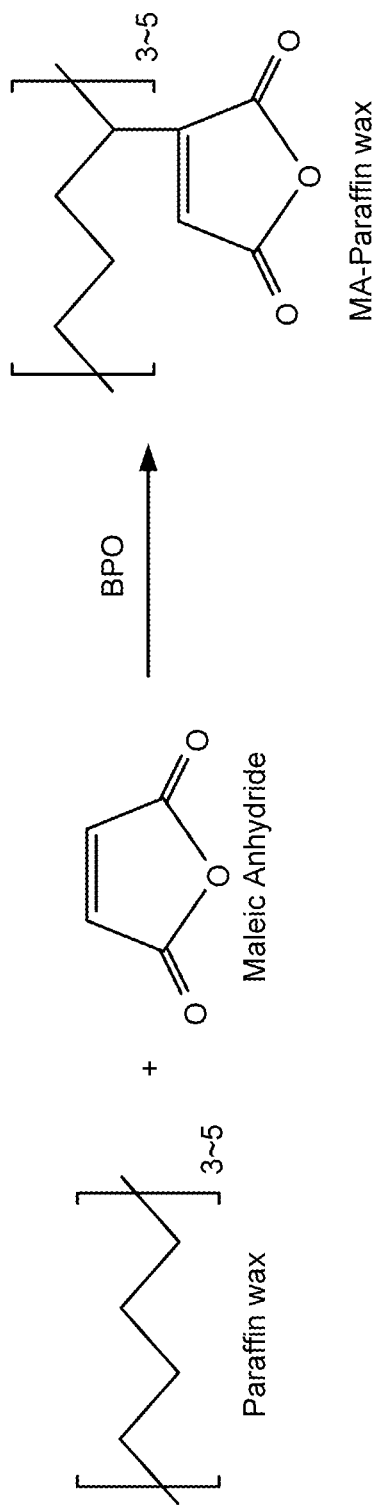
FIG. 1 shows a method for modifying paraffin wax according to the preferred embodiment of the present invention.
Figure 2:
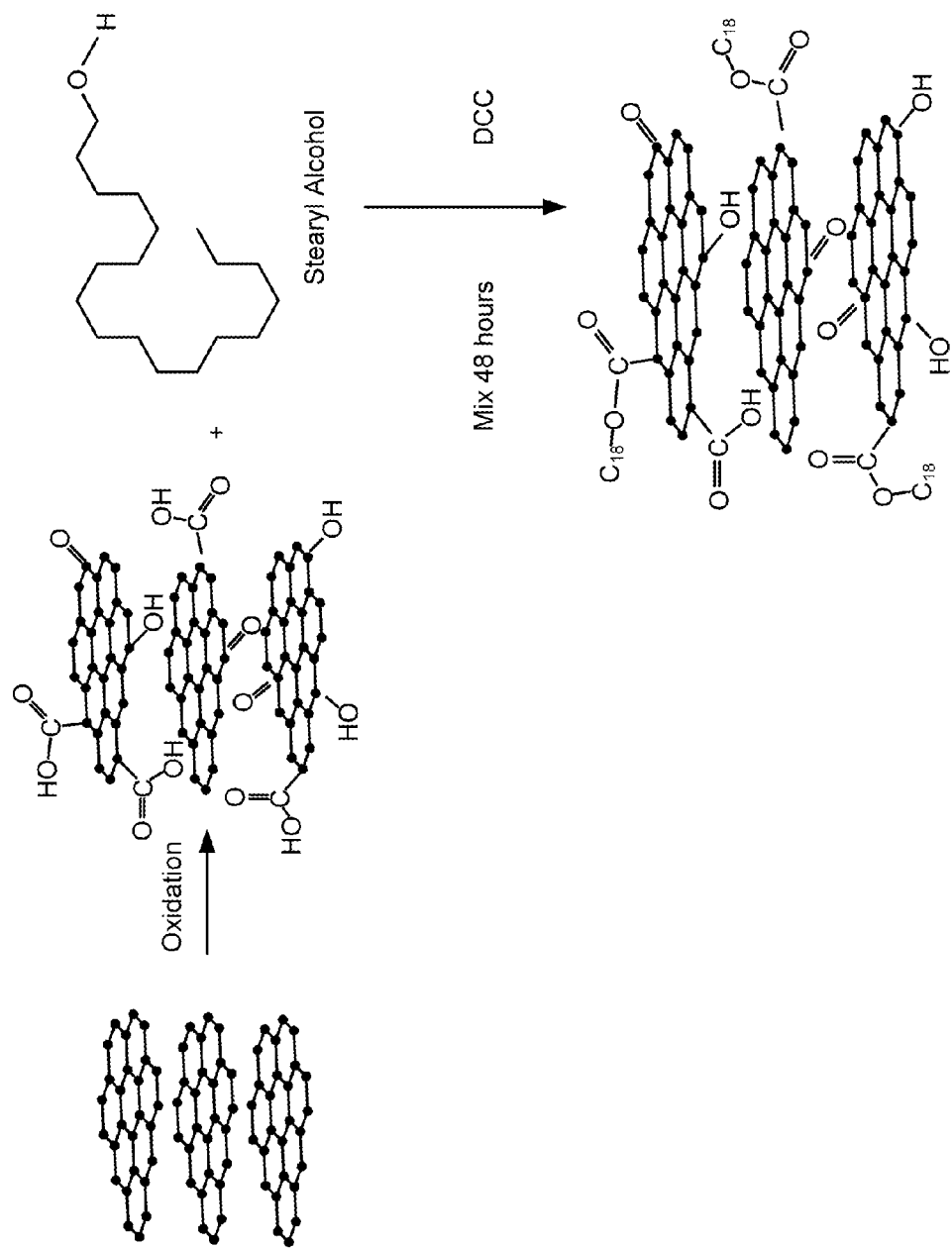
FIG. 2 shows a method for oxidizing and modifying graphite according to the preferred embodiment of the present invention.
Figure 3:
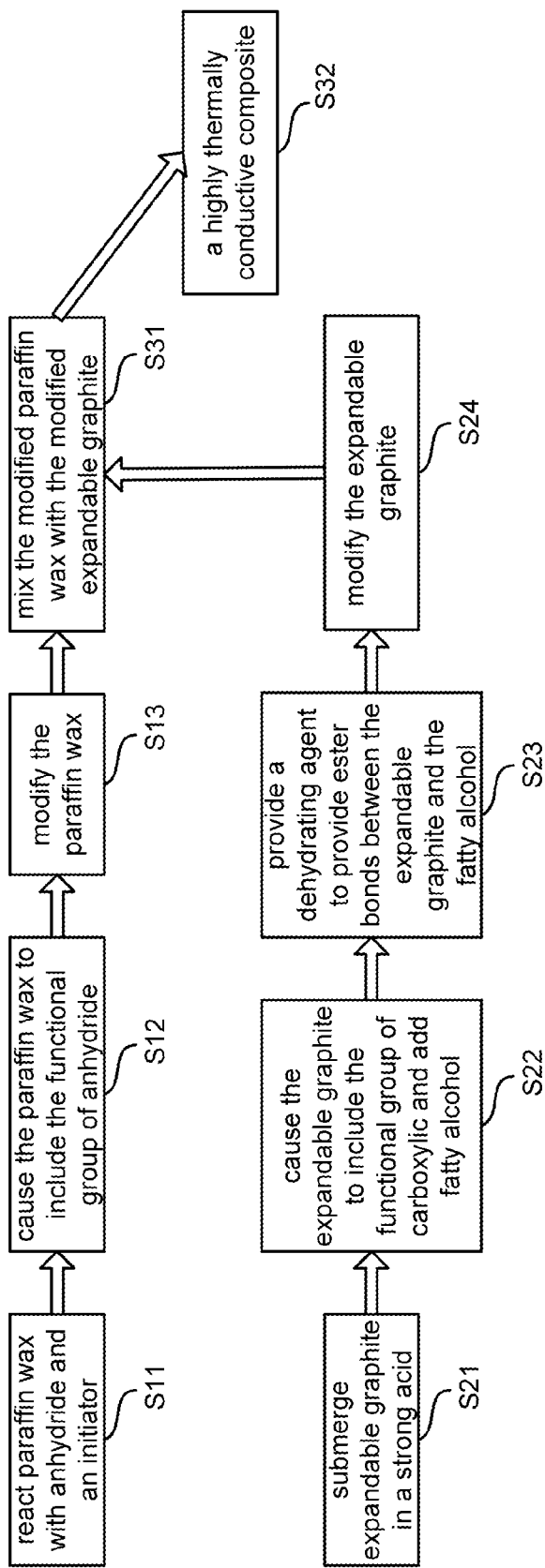
FIG. 3 shows a method for making a highly thermally conductive composite according to the preferred embodiment of the present invention.

Referring to FIGS. 1 through 3, there is shown a method for making a highly thermally conductive composite according to the preferred embodiment of the present invention. At first, there are provided two basic materials. The first basic material is subjected to oxidation so that the first basic material includes the functional group of carboxylic on the surface. Fatty alcohol is added to the first basic material, which includes the functional group of carboxylic. Then, dehydration is executed so that there are ester bonds between the first basic material and the fatty alcohol, thus providing a fatty alcohol-modified first basic material. The second basic material is subjected to apparent activation, thus providing a modified second basic material. Then, the oxidized and organically modified first basic material is melted and mixed with the second basic material so that the first basic material is mixed with the second basic material evenly, thus providing the highly thermally conductive composite.

Referring to FIG. 1, there is shown a method for modifying paraffin wax, the second basic material. In the method for modifying the paraffin wax, at S11, paraffin wax reacts with anhydride and an initiator. Thus, at S12, the paraffin wax includes the functional group of anhydride on the surface. Thus, at S13, the paraffin wax is modified. The anhydride includes unsaturated anhydrides.

The anhydride may be Maleic anhydride for example. The initiator provides free radicals so that the unsaturated bonds on the anhydride react with the paraffin wax. For example, the initiator may be 2,2'-azobisisobutyronitrile ("AIBN"), benzoyl peroxide ("BPO") or dicumyl peroxide ("DCP").

Referring to FIG. 2, there is shown a method for oxidation and organic modification of expandable graphite, the first basic material. In the method for modifying the expandable graphite, at S21, expandable graphite is oxidized. Thus, at S22, the expandable graphite includes the functional group of carboxylic (—COOH) on the surface. Then, fatty alcohol is added to the expandable graphite. At S23, there is provided a dehydrating agent for producing ester bonds between the expandable graphite and the fatty alcohol. Thus, at S24, the expandable graphite is modified. An inorganic strong acid may be used for the oxidation of the expandable graphite so that the surface of the expandable graphite is subjected to oxidation-based modification and includes the functional group of carboxylic (—COOH). The inorganic strong acid may be sulfuric acid or nitric acid for example. The oxidation may be executed by a mixture of strong acids such as a sulfuric acid/nitric acid mixture. In this case, the ratio of the sulfuric acid over the nitric acid is preferably 3:1. The fatty alcohol includes 12 to 30 carbon atoms, preferably 15 to 25 carbon atoms, more preferably 16 to 20 carbon atoms. For example, the fatty alcohol may be dodecyl alcohol, tetradecyl alcohol, hexadecyl alcohol, octadecyl alcohol or 1-eicosanol. Preferably, the fatty alcohol may be hexadecyl alcohol or octadecyl alcohol. Moore preferably, the fatty alcohol may be octadecyl alcohol such as stearyl alcohol. The dehydrating agent may be N,N'-dicyclohexylcarbodiimide ("DCC") for example.

Referring to FIG. 3, at S31, the modified paraffin wax is melted and mixed with the organically modified expandable graphite. Thus, at S32, there is produced a highly stable and thermally conductive composite.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a highly thermally conductive composite, the method including the steps of:
   providing a first basic material;
   providing a second basic material;
   wherein the second basic material is paraffin wax;
   oxidizing the first basic material so that the first basic material includes the functional group of carboxylic on the surface;
   adding fatty alcohol to the first basic material, which includes the functional group of carboxylic;
   providing a dehydrating agent for providing ester bonds between the first basic material and the fatty alcohol, thus modifying the first basic material with the fatty alcohol;
   executing apparent activation on the second basic material, thus modifying the second basic material; and
   melting and mixing the modified first basic material with the modified second basic material so that the modified first basic material is evenly distributed in the modified second basic material, thus providing a highly thermally conductive composite,
   wherein the step of modifying the paraffin wax includes the step of reacting the paraffin wax with anhydride and an initiator so that the paraffin wax includes the functional group of anhydride on side chains.

2. The method according to claim 1, wherein the first basic material is expandable graphite.

3. The method according to claim 1, wherein the anhydride includes unsaturated bonds.

4. The method according to claim 1, wherein the initiator provides free radicals to cause the unsaturated bonds of the anhydride to react with the paraffin wax.

5. The method according to claim 1, wherein the initiator is selected from the group consisting of 2,2'-azobisisobutyronitrile, benzoyl peroxide and dicumyl peroxide.

6. The method according to claim 1,
   wherein the fatty alcohol includes 12 to 30 carbon atoms.

7. The method according to claim 6,
   wherein the fatty alcohol includes 15 to 25 carbon atoms.

8. The method according to claim 7,
   wherein the fatty alcohol includes 16 to 20 carbon atoms.

9. The method according to claim 1,
   wherein the fatty alcohol is selected from the group consisting of dodecyl alcohol, tetradecyl alcohol, hexadecyl alcohol, octadecyl alcohol or 1-eicosanol.

10. The method according to claim 9,
    wherein the fatty alcohol is selected from the group consisting of hexadecyl alcohol or octadecyl alcohol.

11. The method according to claim 10,
    wherein the fatty alcohol is octadecyl alcohol.

12. The method according to claim 2,
    wherein the modified expandable graphite is octadecyl alcohol-modified expandable graphite.

13. The method according to claim 1, wherein the first basic material is expandable graphite, wherein the modified paraffin wax is melted and mixed with the modified expandable graphite to provide the highly thermally conductive composite, wherein the modified expandable graphite is evenly distributed in the highly thermally conductive composite.

14. The method according to claim 13,
    wherein the highly thermally conductive composite exhibits a heat transfer coefficient higher than 1.48 W/m·K when the weight concentration of the modified expandable graphite is higher than 5%.

15. The method according to claim 14, the highly thermally conductive composite exhibits a heat transfer coefficient higher than 4.0 W/m·K when the weight concentration of the modified expandable graphite is higher than 20%.

16. A method for making a highly thermally conductive composite, the method including the steps of:
    providing a first basic material;
    providing a second basic material;
    oxidizing the first basic material so that the first basic material includes the functional group of carboxylic on the surface;
    adding fatty alcohol to the first basic material, which includes the functional group of carboxylic;
    providing a dehydrating agent for providing ester bonds between the first basic material and the fatty alcohol, thus modifying the first basic material with the fatty alcohol;
    wherein the dehydrating agent is N,N'-dicyclohexylcarbodiimide ("DCC");
    executing apparent activation on the second basic material, thus modifying the second basic material; and
    melting and mixing the modified first basic material with the modified second basic material so that the modified first basic material is evenly distributed in the modified second basic material, thus providing a highly thermally conductive composite.

17. A method for making a highly thermally conductive composite, the method including the steps of:
- providing a first basic material;
- providing a second basic material;
- oxidizing the first basic material so that the first basic material includes the functional group of carboxylic on the surface;
- wherein the oxidation is executed in an oxidizing strong acid;
- wherein the oxidizing strong acid is a mixture of sulfuric acid with nitric acid at a volume ratio of 3:1;
- adding fatty alcohol to the first basic material, which includes the functional group of carboxylic;
- providing a dehydrating agent for providing ester bonds between the first basic material and the fatty alcohol, thus modifying the first basic material with the fatty alcohol;
- executing apparent activation on the second basic material, thus modifying the second basic material; and
- melting and mixing the modified first basic material with the modified second basic material so that the modified first basic material is evenly distributed in the modified second basic material, thus providing a highly thermally conductive composite.

\* \* \* \* \*